United States Patent
Acemoglu et al.

(10) Patent No.: US 12,461,359 B2
(45) Date of Patent: Nov. 4, 2025

(54) DEVICE FOR THE SPHERICAL ORIENTATION OF AN OPTICAL ELEMENT, IN PARTICULAR FOR DIRECTING A LIGHT BEAM, SUCH AS A LASER BEAM

(71) Applicant: FONDAZIONE ISTITUTO ITALIANO DI TECNOLOGIA, Genoa (IT)

(72) Inventors: Alperen Acemoglu, Genoa (IT); Leonardo Serra De Mattos, Genoa (IT)

(73) Assignee: FONDAZIONE ISTITUTO ITALIANO DI TECNOLOGIA, Genoa (IT)

( * ) Notice: Subject to any disclaimer, the term of this patent is extended or adjusted under 35 U.S.C. 154(b) by 642 days.

(21) Appl. No.: 17/797,157

(22) PCT Filed: Feb. 4, 2021

(86) PCT No.: PCT/IB2021/050897
§ 371 (c)(1),
(2) Date: Aug. 3, 2022

(87) PCT Pub. No.: WO2021/156779
PCT Pub. Date: Aug. 12, 2021

(65) Prior Publication Data
US 2023/0050641 A1 Feb. 16, 2023

(30) Foreign Application Priority Data
Feb. 4, 2020 (IT) .................. 102020000002155

(51) Int. Cl.
*G02B 26/10* (2006.01)
*G02B 7/182* (2021.01)
*G02B 26/08* (2006.01)

(52) U.S. Cl.
CPC .......... *G02B 26/101* (2013.01); *G02B 7/182* (2013.01); *G02B 7/1821* (2013.01); *G02B 26/0816* (2013.01)

(58) Field of Classification Search
CPC .... G02B 7/1821; G02B 26/101; G02B 7/182; G02B 26/0816; G02B 26/105
See application file for complete search history.

(56) References Cited

U.S. PATENT DOCUMENTS

| 5,966,991 A | 10/1999 | Gosselin et al. |
| 2003/0197910 A1 | 10/2003 | Witt et al. |

(Continued)

FOREIGN PATENT DOCUMENTS

| EP | 1233295 A1 | 8/2002 |
| EP | 2738572 A1 | 6/2014 |

(Continued)

OTHER PUBLICATIONS

International Search Report and Written Opinion, Application No. PCT/IB2021/156779, mailed May 11, 2021 (11 pages).

*Primary Examiner* — Thomas K Pham
*Assistant Examiner* — Ruby Lucia Kauffman
(74) *Attorney, Agent, or Firm* — Falcon Rappaport & Berkman LLP

(57) ABSTRACT

A device for the spherical orientation of an optical element is provided comprising a support structure, the optical element having an optically useful surface adapted to interact with an incident light beam, a mechanism mounted on support structure and capable of rotating the optical element in space around a first and second rotation axis perpendicular to each other.
The mechanism comprises a first rotating assembly around the first rotation axis and a second rotating assembly around the second rotation axis, which first rotating assembly has a through cavity defined around the first rotation axis, the (Continued)

through cavity being adapted to be crossed by the light beam and facing the optical element.

The mechanism comprises at least a first electromagnetic actuator arranged to rotate the first rotating assembly and at least a second electromagnetic actuator arranged to rotate the second rotating assembly.

5 Claims, 10 Drawing Sheets

(56) References Cited

U.S. PATENT DOCUMENTS

| | | |
|---|---|---|
| 2005/0161509 A1 | 7/2005 | Aizawa et al. |
| 2006/0067672 A1 | 3/2006 | Washisu et al. |
| 2008/0304023 A1 | 12/2008 | Bang |
| 2017/0198885 A1* | 7/2017 | Caldwell .............. G02B 7/1821 |

FOREIGN PATENT DOCUMENTS

| | | | |
|---|---|---|---|
| EP | 1975571 A2 * | 10/2018 | ........... G01S 7/4817 |
| WO | 2015181771 A1 | 12/2015 | |

* cited by examiner

DEVICE FOR THE SPHERICAL ORIENTATION OF AN OPTICAL ELEMENT, IN PARTICULAR FOR DIRECTING A LIGHT BEAM, SUCH AS A LASER BEAM

The present invention relates to a device for the spherical orientation of an optical element, in particular for directing a light beam, such as a laser beam.

Devices for the spherical orientation of an optical element are known in the art. Particularly but not exclusively, such devices may be used for the motorized control of the direction in space of a light beam, for example a laser beam.

One of the possible fields of application for such devices is that of laser surgery or microsurgery. In particular, the aforementioned type of devices known in the field are manually operated so as to orient in space a mirror which converges and directs the light beam as a function of the position assumed thereby.

This type of device has numerous disadvantages, including that of not providing a motorized system and the fact that they are not controllable in a computer-assisted manner, which translates into the disadvantage of not being able to improve surgical quality in terms of precision and safety, precluding the application of certain measures such as the automatic execution of scanning movements, tremor filtering, movement reduction, and such as the adoption of personalized, more ergonomic and intuitive control interfaces.

U.S. Pat. No. 5,966,991 makes known the use of a device for spherical orientation in two degrees of freedom, which provides for a mechanism driven by a pair of rotary actuators in turn fixed to a support structure.

However, the configurations of devices using rotary motors have several drawbacks. One drawback is the fact that they are not suitable for use in combination with optical elements of the type intended to be crossed by the light beam (known as the see-through type), since the mechanisms adopted provide rotating assemblies which overlap with the trajectory of the incident light beam and are adapted to interact with the optical element.

A further drawback is that the rotation of the motors is strictly dependent on the transmission ratio selected. For example, for certain transmission ratio values, the precision in positioning the optical element can also be made very high, but in this case it decreases the maximum speed reachable, and vice versa.

Document WO 2015/181771 describes a similar device which includes a mechanism capable of rotating the optical element by means of two rotating assemblies around two axes perpendicular to each other. The first rotating assembly has a through cavity designed to be crossed by the light beam and facing the optical element, two linear actuators being provided for rotating the two rotating assemblies.

While representing a major step forward from the prior art, the device described by WO 2015/181771 has some drawbacks. Firstly, the use of linear actuators and mechanical joints causes problems of static and dynamic friction and recoils at each rotation, with non-negligible overall dimensions and inertia. Due to the friction and mechanical clearance of the joints, precise and accurate laser position control is very difficult to achieve.

The complexity of the orientation mechanism also makes the device difficult to manufacture and somewhat prone to wear and malfunctions. In particular, the resolution of the laser position which is control currently required must be less than 50-100 μm. However, achieving this goal is very challenging with standard actuators.

The object of the present invention is to provide a device capable of solving the above-mentioned drawbacks of the prior art, and which can be simultaneously produced in a simple and economical manner.

The present invention aims to overcome the drawbacks of the state of the art and to achieve the above objects with a device for the spherical orientation of an optical element, which device comprises a support structure, one said optical element having an optically useful surface adapted to interact with an incident light beam and a mechanism mounted on said support structure and capable of rotating said optical element in space around a first and second rotation axis perpendicular to each other. Said mechanism comprises a first rotating assembly around the first rotation axis and a second rotating assembly around the second rotation axis. The first rotating assembly has a through cavity defined around said first rotation axis, adapted to be crossed by said light beam and facing said optical element. Said mechanism comprises at least one first electromagnetic actuator arranged to rotate said first rotating assembly and at least one second electromagnetic actuator arranged to rotate said second rotating assembly.

The spherical orientation mechanism is thus greatly simplified with several advantages. In fact, recoils are avoided and it is possible to increase speed and precision of movement. At the same time, an easy-to-manufacture, compact and small device can be obtained. The use of magnetic actuators allows to create a low power system, especially compared to state-of-the-art devices provided with actuators with direct current electric motors.

According to the present invention, one or more optical elements can be driven with said electromagnetic drive mechanism. Such optical elements may include a beam deflection plane mirror, a spherical mirror, any type of reflective surface, all types of optical lenses or a combination of different types of optical lenses and/or mirrors and/or beam deflection components and/or all types of optical elements with reflective/refractive surfaces.

The different types of optical elements may be used i) to change the angle and direction of the light beam(s), ii) to focus the light beam(s) at a desired distance, iii) to blur the light beam(s).

In an embodiment the first rotating assembly is rotatably coupled to the support structure and the second rotating assembly is coupled to the first rotating assembly and comprises a support member of said optical element.

This allows to create a serial kinematic chain in which articulated joints supporting the optical element by the individual rotating assemblies are not necessary, but the latter are placed in series to orient the optical element by means of a sum of actions. This significantly contributes to reducing overall dimensions, and therefore allows to have as open a line of view as possible, so as to be able to pass even more than one light beam, for example two or more laser beams.

This is particularly advantageous in combination with magnetic actuators, which are in fact physically coupled but offer independent degrees of freedom in terms of inclination with respect to the two rotation axes (tip and tilt). This reduces the mechanical complexity and overall dimensions of the device.

Due to the use of a serial kinematic chain, the minimum torque requirements for rotation are different for the two rotation axes: for the first rotation axis, the first electromagnetic actuator must compensate the weights of the optical element and the second rotating assembly, with all the components thereof; however, for the second rotation axis, the second electromagnetic actuator must only compensate the weight of the optical element and the other components of the second rotating assembly.

Thus, a second electromagnetic actuator may be used for movement around the second rotation axis which is smaller than the first electromagnetic actuator for movement around the first rotation axis. This results in the overall dimensions of the system being minimized.

According to a preferred embodiment the first and/or the second electromagnetic actuator are arcuate in shape and are positioned radially spaced from the first and/or the second rotation axis, respectively.

In an embodiment example, the first electromagnetic actuator comprises a first fixed coil and a first movable magnetic element. Alternatively or in combination, the second electromagnetic actuator comprises a second fixed coil and a second movable magnetic element. Preferably such actuators are of the voice-coil type and consist of a permanent magnet element and a coil. The electric current flowing through the coil turns interacts with the permanent magnetic field and generates a force vector perpendicular to the direction of the current. The force vector can be reversed by changing the polarity of the current flowing through the coil. Such actuators allow to obtain simple design and construction, low hysteresis, reduced dimensions for a more efficient design impact and high accelerations. Switching and the risk of any blockage are also avoided.

In an embodiment example, the first rotating assembly comprises a tubular element having a longitudinal axis coinciding with the first rotation axis and defining said through cavity. The first electromagnetic actuator comprises one said first circumferentially arc-shaped magnetic element centred in the first rotation axis. Such first magnetic element is coupled externally to the tubular element so that the first magnetic element lies on said circumference centred in the first rotation axis. The first electromagnetic actuator further comprises one said first coil fixed to the support structure and shaped so as to have an arcuate housing seat for rotating said first magnetic element.

According to an embodiment, the support structure is provided with a tubular element support seat, in which seat the tubular element is rotatably coupled by means of a bearing.

According to a further embodiment, the second electromagnetic actuator comprises one said second circumferentially arc-shaped magnetic element centred in the second rotation axis. Such a second magnetic element is coupled to the support member of the optical element so that the second magnetic element lies on said circumference centred in the second rotation axis. The second electromagnetic actuator further comprises one said second coil fixed to the first rotating assembly and shaped so as to have an arcuate housing seat for rotating said second magnetic element.

According to an alternative embodiment, the first electromagnetic actuator comprises a first movable coil and a first fixed magnetic element and/or the second electromagnetic actuator comprises a second movable coil and a second fixed magnetic element. Advantageously, the first and the second rotating assembly can be configured as shown heretofore and described in the following with reference to the figures, with the magnetic actuators having inverted movable and fixed parts.

According to a further embodiment, the first rotating assembly and/or the second rotating assembly comprise one or more rotary encoders for feedback control.

The encoders are preferably integrated and can be of any type currently known, for example hall effect, optical, resistive or of another type and directly measure the output axis, avoiding the typical errors of the rotary encoders connected through a reducer, introduced by mechanical connections and joints.

The device object of the present invention allows to obtain a control of the position of the high-speed laser with greater precision and accuracy.

The use of curvilinear electromagnetic actuators facilitates orientation control by minimizing the dimensions of the actuators and therefore of the entire device, eliminating the need for mechanical joints. The device can thus have an extremely compact shape and be ready to accommodate optical elements of different sizes. The simple construction and the absence of gears make it a robust device. The compact design is particularly advantageous for surgical and microsurgical applications, since it does not hinder the movement of other surgical instruments.

The reduced mechanical complexity makes the device easy to manufacture and the absence of mechanical connections avoids clearance problems.

The inertia of the system is minimized, as are static and dynamic friction.

The laser position control is uniform thanks to improved resolution.

The device may repeat recorded trajectories at high speed. This is important to improve laser-tissue interaction during laser microsurgery.

The device may be used to create a computer-controlled laser scanner, allowing programmable laser scanning motions, precise laser pointing, and fast laser scanning, and may also be operated remotely with any motion sensor, tablet, mouse, or similar devices.

Magnetic curvilinear actuators provide high precision and high speeds.

These and other features and advantages of the present invention will become clearer from the following description of some non-limiting exemplary embodiments illustrated in the attached drawings in which.

Figure 1:
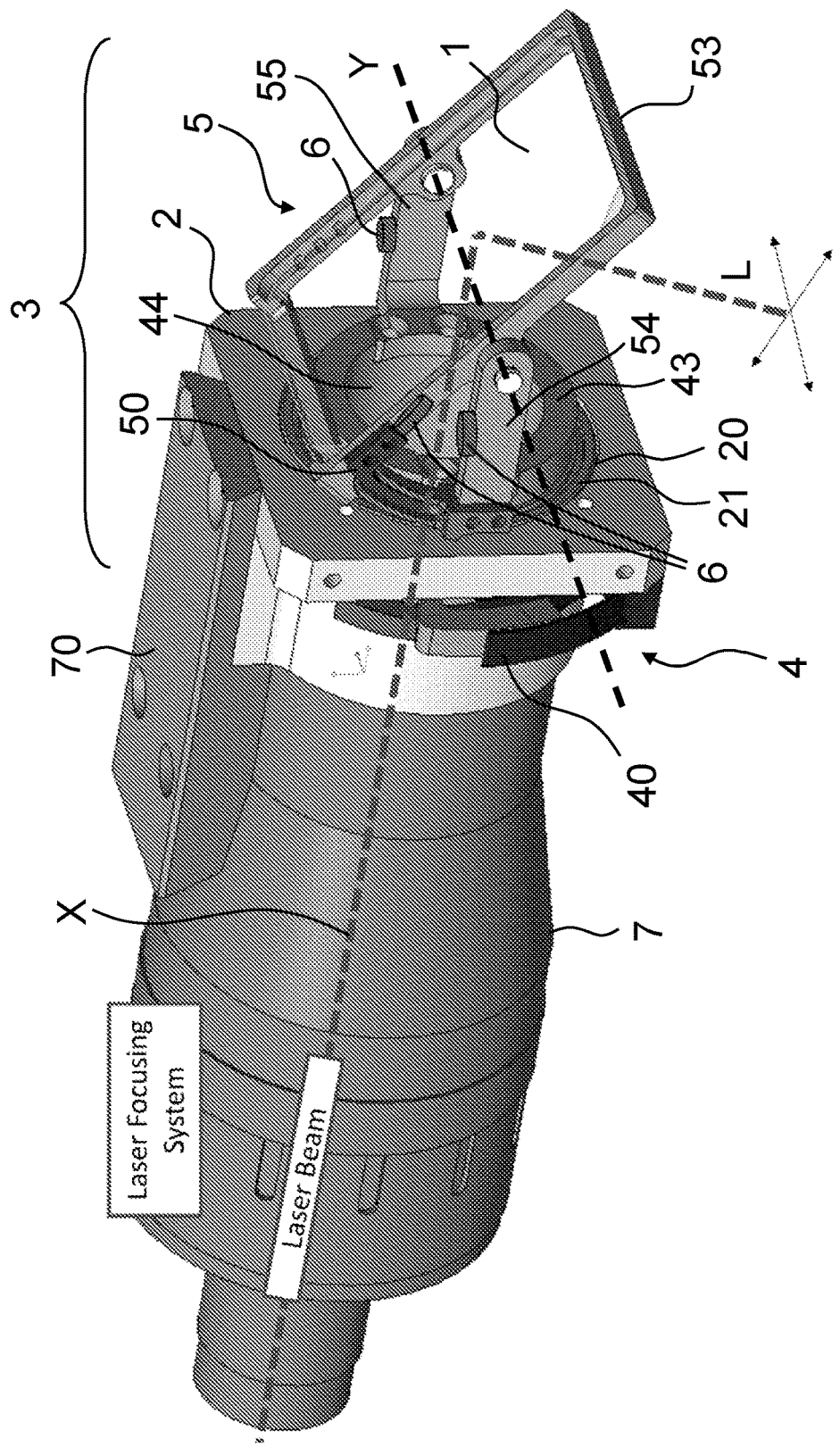
FIG. 1 illustrates an overall view of the device mounted on a laser focusing system.
Figure 2:
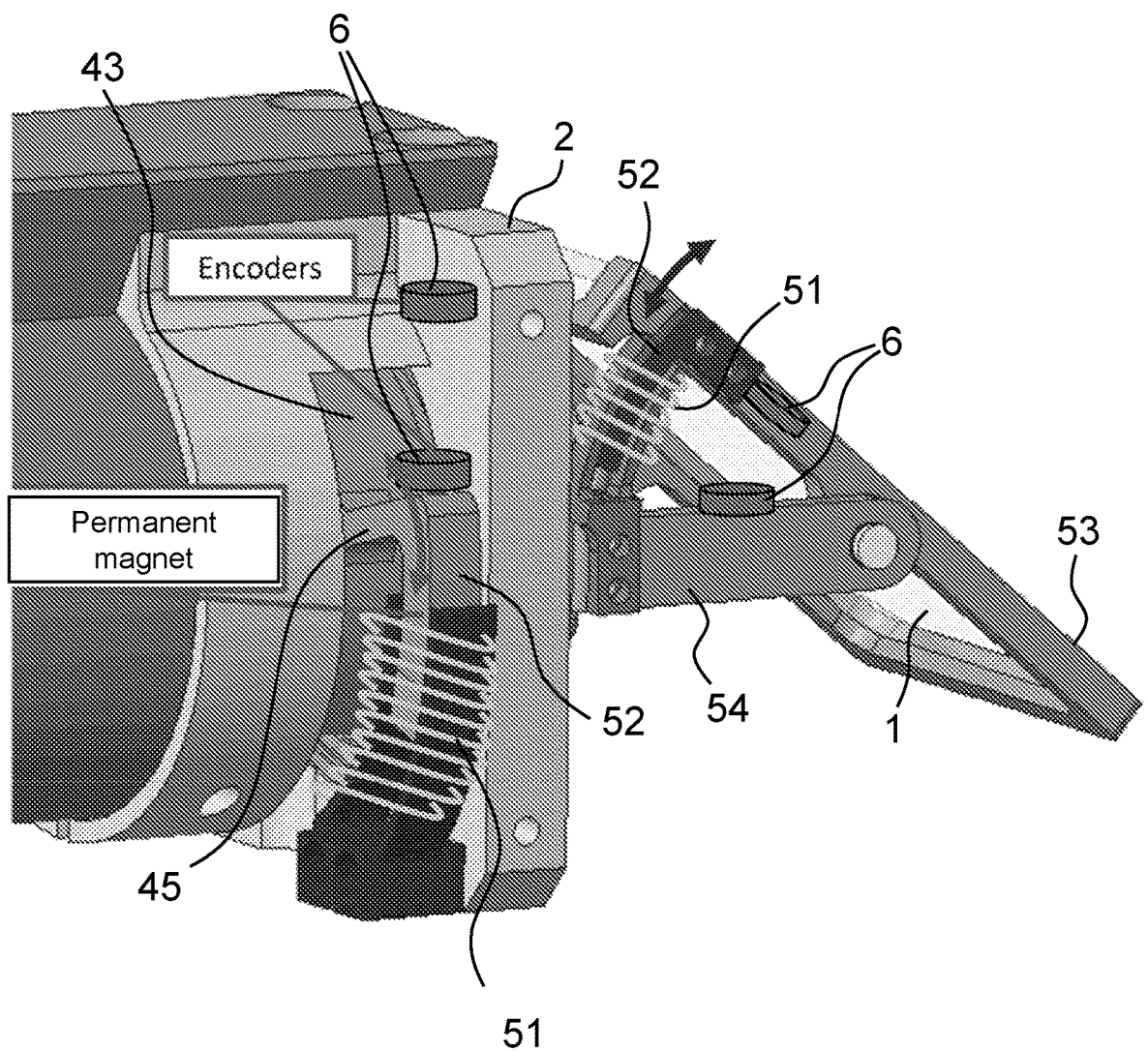
FIGS. 2 and 3 illustrate different detailed views of the rotation mechanism of the optical element.
Figure 3:
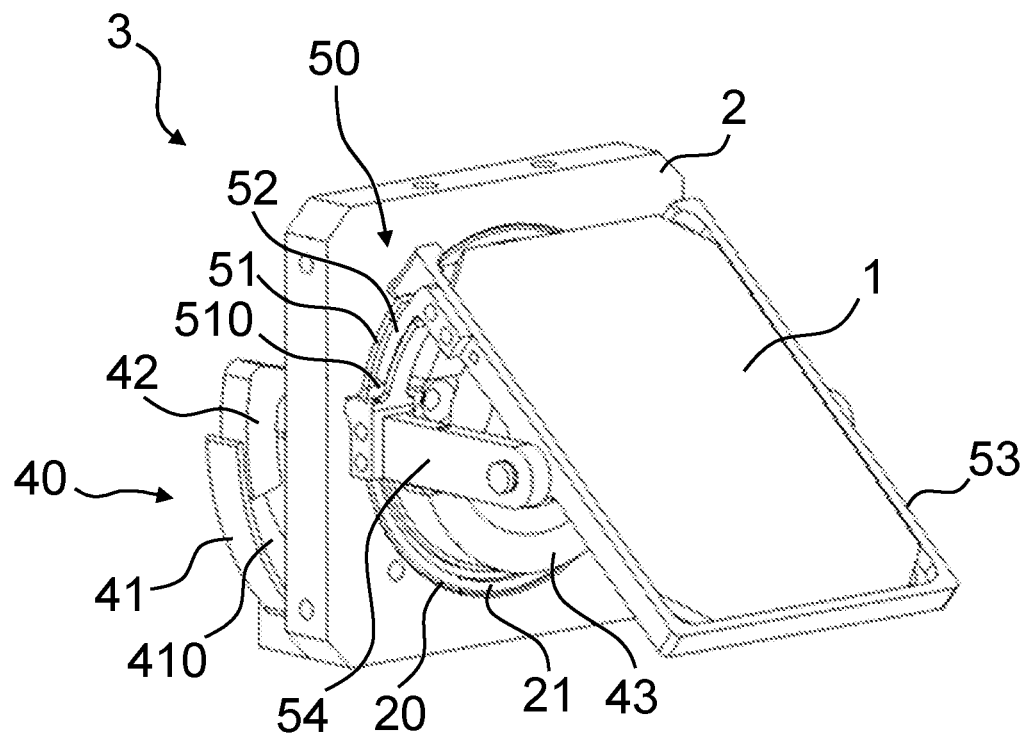
Figure 4:
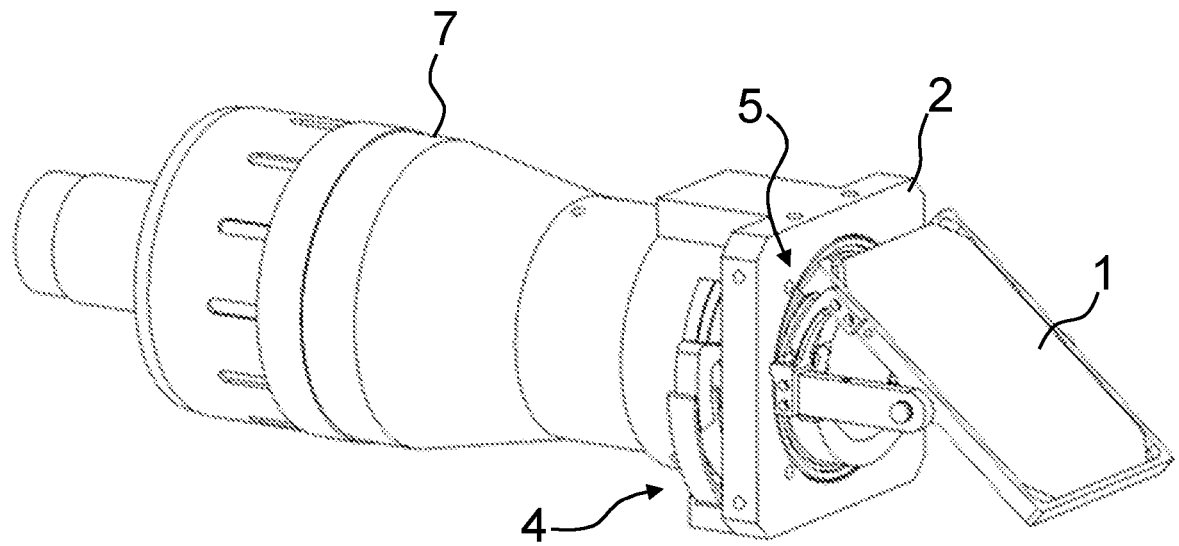
FIGS. 4, 5 and 6 illustrate different overall views of the device.
Figure 5:
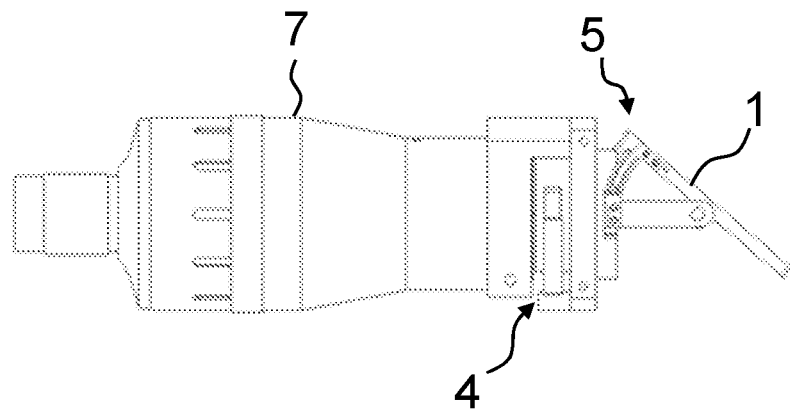
Figure 6:
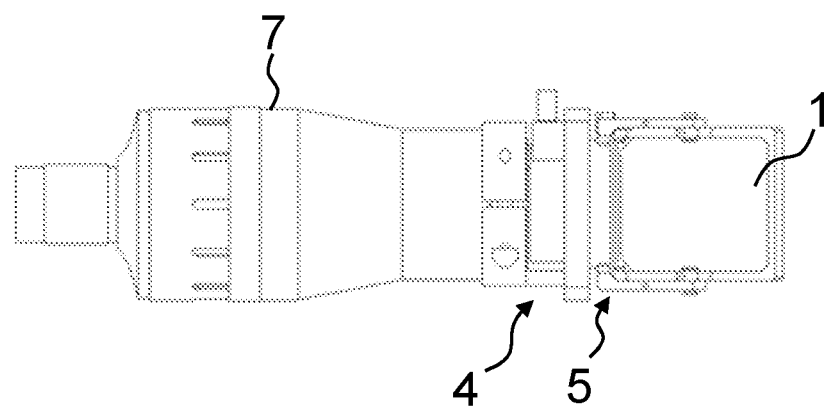
Figure 7:
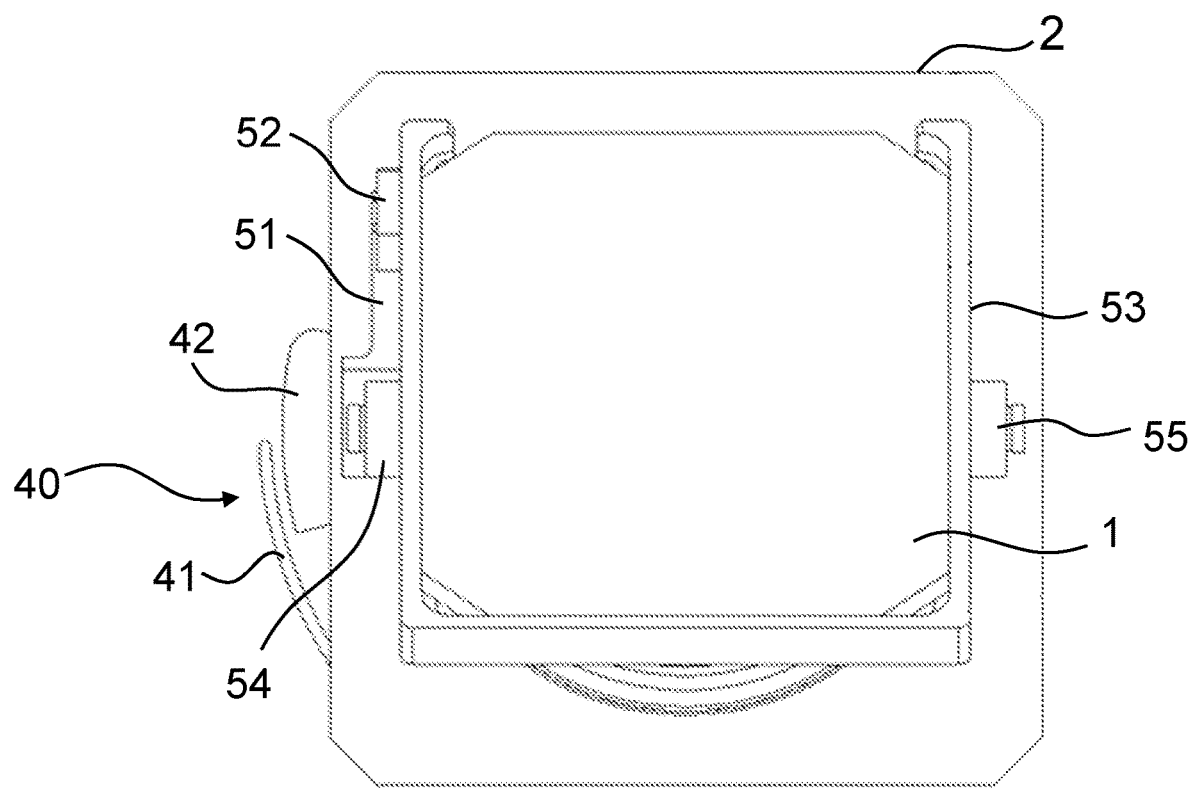
FIG. 7 illustrates a head view of the device.

With reference to the figures, a non-limiting embodiment of the device for the spherical orientation of an optical element is illustrated in different perspectives and viewed from different angles. In particular, the device is adapted to be used to direct a light beam L, such as a laser beam. One of the possible fields of application for the aforementioned device is, for example, that of laser (micro)surgery. In this regard, the device can be operated so as to orient the optical element 1, such as a mirror, in the desired arrangement in space, which converges and directs the light beam L as a function of the position assumed by such an optical element 1. However, the device can also be used more generally to direct different optical elements and in different types of application scopes. For example, it may also be conceivable to use such a device to orient optical elements such as sensors or lenses in space for a variety of purposes. The device comprises a support structure 2, an optical element 1 having an optically useful (non-numbered) surface adapted to interact with an incident light beam L (e.g., a laser beam). The device further comprises a mechanism 3 mounted on the support structure 2 and capable of arranging the optical element 1 by rotating it around a first and second fixed rotation axis X and Y perpendicular to each other. In particular, by means of the mechanism 3, the rotation of the optical element 1 around the first axis X and the rotation of the optical element 1 around the second axis Y are controllable separately and independently of each other, thus conferring overall two degrees of freedom of movement to the optical element 1. Thereby, in the illustrated embodiment, the light beam L directed towards the optical element 1 is capable of being directed at any point having x,y coordinates and located on a reference surface (for example, a surgical site in the exemplary case of laser surgery) towards which the optically useful surface of the optical element 1 is directed.

The device can be mounted on a system for generating and/or focusing a laser 7 through fixing means of the support structure 2. Such fixing means may comprise for example one or more connecting plates 70 fixable by screws to the laser generating and/or focusing system and to the support structure 2.

The mechanism 3 comprises a first rotating assembly 4 around the first rotation axis X and a second rotating assembly 5 around the second rotation axis Y.

In the illustrated embodiment, the first assembly 4 comprises a tubular element 43 having a longitudinal axis coinciding with the first rotation axis X. The tubular element 43 defines a through cavity 44 adapted to be crossed by the light beam L and facing the optical element 1.

Figure 8:
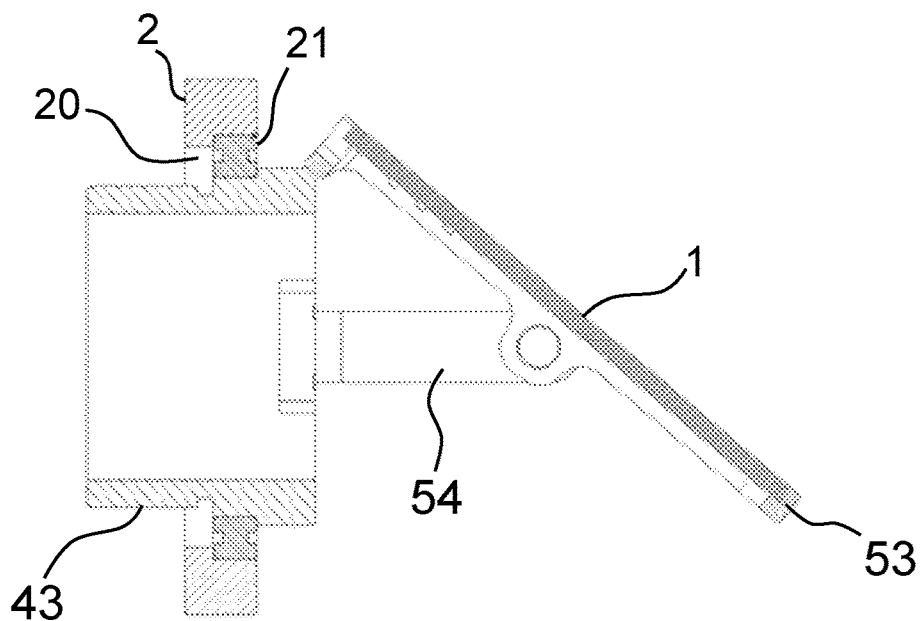
FIG. 8 illustrates a sectional view along a plane parallel to the first rotation axis and perpendicular to the second rotation axis.

The support structure 2 is provided with a support seat 20 of the tubular element 43, in which seat the tubular element 43 is rotatably coupled by a bearing 21, visible for example in the sectional view of FIG. 8. The support structure 2 can be modified specifically for use with any laser generating and/or focusing system 7.

The mechanism 3 comprises a first electromagnetic actuator 40 arranged to rotate the first assembly 4, i.e., to exert a thrust or pull stress along a first arcuate direction of actuation radially spaced from the first rotation axis X.

The actuation mechanism is based on the interaction between a permanent magnet and the magnetic field induced by an electromagnetic coil. Since the current is supplied to the coil, a magnetic field is induced inside the electromagnetic coil. The permanent magnet located in this electromagnetic field is exposed to a magnetic force. This magnetic force drives the movement around the rotation axis.

Figure 9:
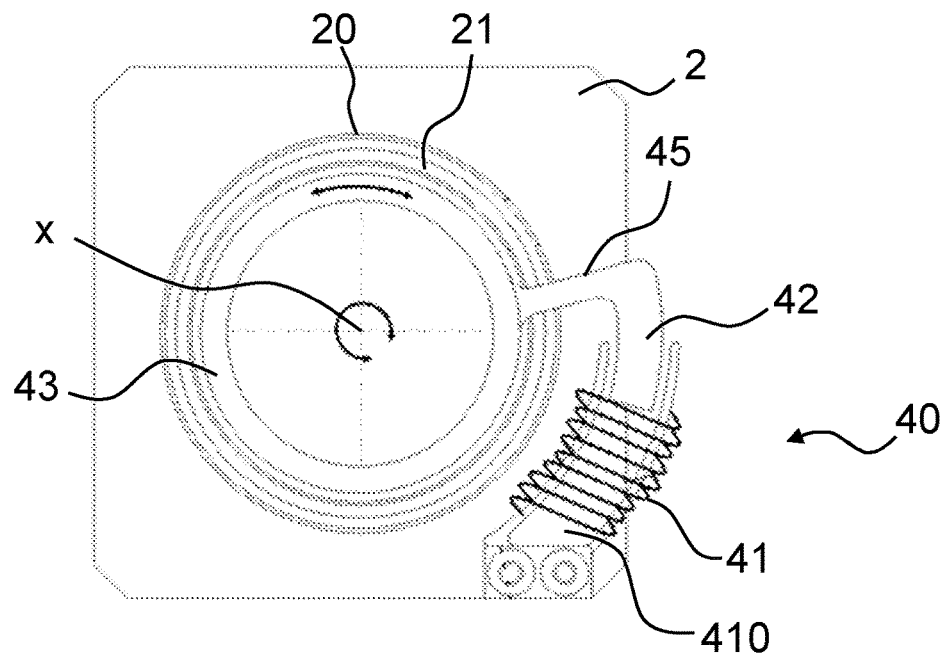
FIG. 9 illustrates a detailed view of the first electromagnetic actuator.
Figure 10:
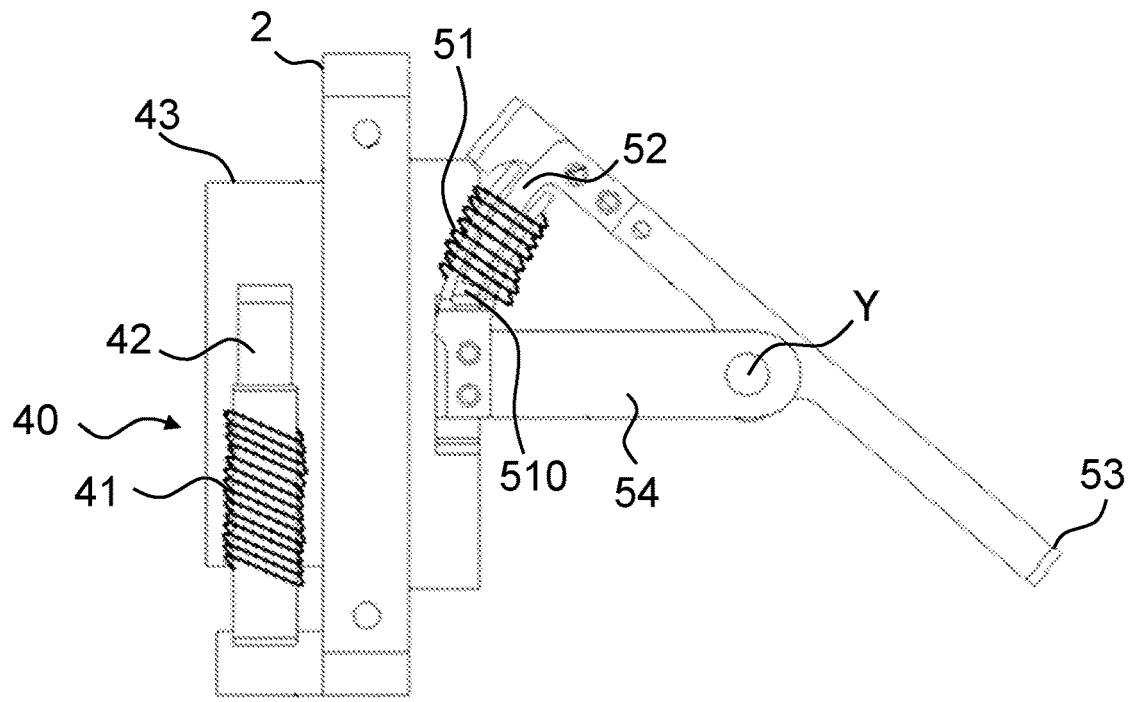
FIG. 10 illustrates a side view of the rotation mechanism.

As illustrated in detail in FIG. 9, the first electromagnetic actuator 40 comprises a first fixed coil 41 and a first movable magnetic element 42, preferably consisting of a permanent magnet.

Figure 11:
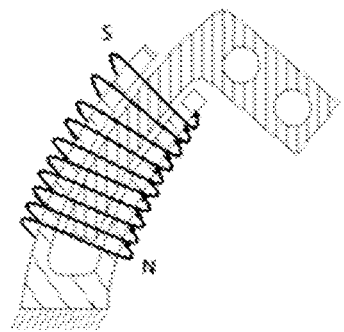
FIGS. 11 and 12 illustrate detailed views of the magnetic actuators.
Figure 12:
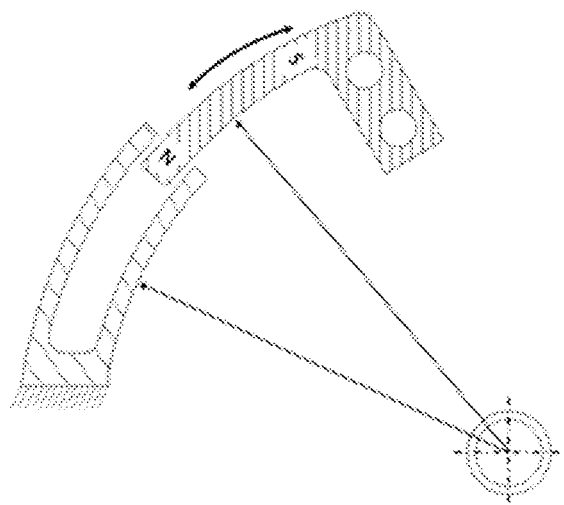

The first magnetic element 42 is circumferentially arc-shaped and centred in the first rotation axis X, as shown in FIG. 11 or 12 and is coupled externally to the tubular element 43 so that it lies on said circumference centred in the first rotation axis X.

As illustrated in FIG. 9, the first magnetic element 42 is fixed externally to the sleeve surface of the tubular element 43 by a spacer element 45 extending from the tubular element 43 in a substantially radial direction with respect to the first rotation axis X.

The first electromagnetic actuator 40 further comprises a first coil 41 fixed to the support structure 2 and shaped so as to have an arcuate housing seat 410 for rotating said first magnetic element 42.

The curvature of the first magnetic element 42 is advantageously the same as that of the coil 41. The coil 41 consists of a metallic electromagnetic base on which the turns of a conductor are wound. The electromagnetic base consists of two curvilinear plate-shaped elements facing each other so as to form said arcuate seat 410.

While the first rotating assembly 4 is rotatably coupled to the support structure 2, the second rotating assembly 5 is coupled to the first rotating assembly 4.

The second rotating assembly 5 comprises a support member 53 of the optical element 1, preferably consisting of a frame surrounding at least part of the outer perimeter thereof.

The support member 53 is tiltingly fixed to the tubular element 43 around the second rotation axis Y by a pair of support arms 54 to form the second rotating assembly 5.

The mechanism 3 comprises at least one second electromagnetic actuator 50 arranged to rotate the second rotating assembly 5 causing a thrust or pull stress on the latter along a second arcuate direction of actuation, transversely spaced with respect to the second rotation axis Y. The second electromagnetic actuator 50 is spaced from the coupling hinges of the support member 53 of the optical element with the support arms 54, placed on the second rotation axis Y. In the example in the figure, the second electromagnetic actuator 50 is placed respectively near the base of a support arm 54 constrained to the tubular element 43 and near a free end of the support member 53 of the optical element 1.

The second electromagnetic actuator 5 comprises a second fixed coil 51 and a second movable magnetic element 52 circumferentially arc-shaped and centred in the second rotation axis Y.

The second magnetic element 52 is coupled to the support member 53 of the optical element 1 such that it lies on said circumference centred in the second rotation axis Y.

The second electromagnetic actuator 50 comprises a second coil 51 fixed to the support arm 54 and consequently to the first rotating assembly 4. The second coil 51 is configured so as to have an arcuate housing seat 510 for rotating said second magnetic element 52. The curvature of the second magnetic element 52 is advantageously the same as that of the arcuate seat 510.

As described for the first electromagnetic actuator 40, the curvature of the second magnetic element 52 is advantageously the same as that of the second coil 51. The second coil 51 also consists of a metallic electromagnetic base on which the turns of a conductor are wound. The electromagnetic base consists of two curvilinear plate-shaped elements facing each other so as to form said arcuate seat 510.

Thereby, a fast and precise simultaneous drive of the device is obtained and it is also allowed to use optical elements 1 of the type intended to be crossed by the light beam (also referred to as the see-through type). An example of such optical elements can be a polariser or a semitransparent mirror, or—more generally—a beam splitter element.

In the illustrated embodiment, the device further comprises a system for generating and/or focusing a laser beam 7, of a type known per se, and adapted to emit the beam by directing it through the through cavity 44. For example, the laser generating and/or focusing system 7 is fixed to the support structure 2 in an aligned position with respect to the through cavity 44 and, particularly, coaxial with the first rotation axis X.

Both the first rotating assembly 4 and the second rotating assembly 5 comprise one or more rotary encoders 6 for feedback control. The encoders 6 are preferably integrated and can be of any type currently known, for example hall effect, optical, resistive or of another type and directly measure the output axis.

As is clear from the figures, the same principle is used for rotations around the first and the second rotation axis X and Y, and the actuators are positioned for different axes. The shape of the components is preferably the same for both actuators, but the dimensions are different, so that the first and the second actuator 40 and 50 are to scale.

The minimum torque requirements for movement are in fact different for the rotation axes X and Y due to the mechanical design of the system. For the first rotation axis X, the first actuator 40 must compensate for the weights of the optical element 1, i.e., the beam deflection mirror, as well as the mirror support member 53, the mirror support arms 54, the second actuator of the axis Y and the encoder 6.

For the second rotation axis Y, the second electromagnetic actuator 50 must only compensate for the weight of the optical element 1 and the support member 53 of the optical element.

Thus, a smaller actuator can be used for the movement around the second rotation axis Y and the overall dimensions of the system can be minimized.

As is clear to those skilled in the art, the first actuator 40 and the second actuator 50 can preferably be driven simultaneously so as to carry out the movement of the optical element 1 in space.

The device described above allows a laser position control resolution below 50-100 μm.

In the embodiment illustrated in the figures a single electromagnetic actuator is positioned for each axis. However, multiple actuators can be provided for both the first rotating assembly 4 and the second rotating assembly 5. Particularly, several first actuators 40 can be positioned circumferentially around the tubular element 43 and/or two second actuators on both support arms of the support member 53 of the optical element 1.

As an alternative to what is illustrated in the figures, it is possible to provide that the first electromagnetic actuator 40 comprises a first movable coil and a first fixed magnetic element and/or the second electromagnetic actuator comprises a second movable coil and a second fixed magnetic element.

Various optical elements are illustrated in FIGS. 13 to 17 and may be used according to the invention.

Figure 13:
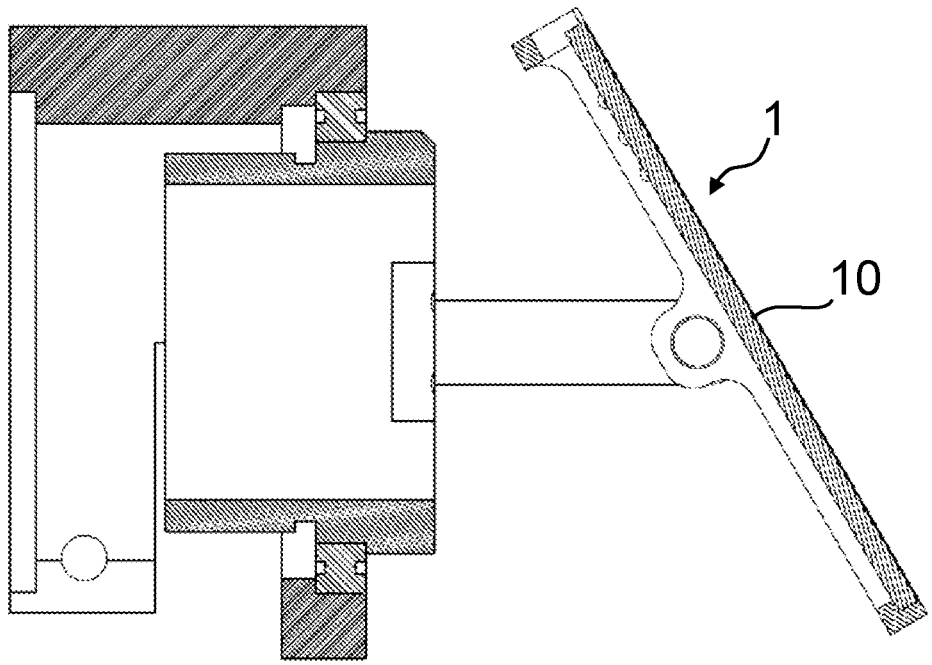
FIGS. 13 to 17 illustrate different optical elements.

In the embodiment of FIG. 13 the optical element 1 consists of a transparent deflection plane mirror 10 of the light beam.

Figure 14:
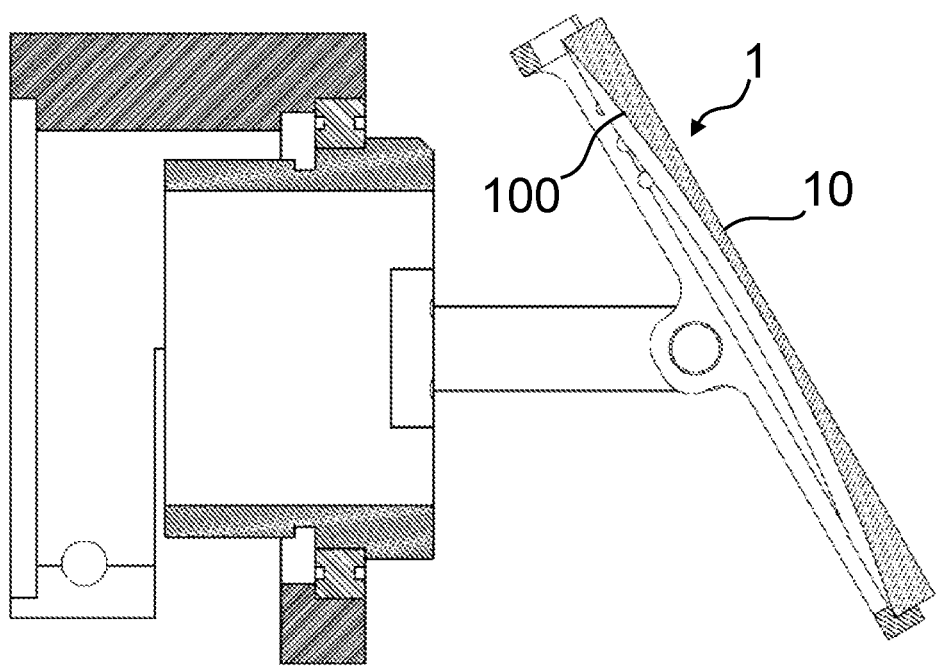

In the embodiment of FIG. 14 the optical element 1 consists of a spherical mirror 10, which has a concave reflecting surface 100.

Figure 15:
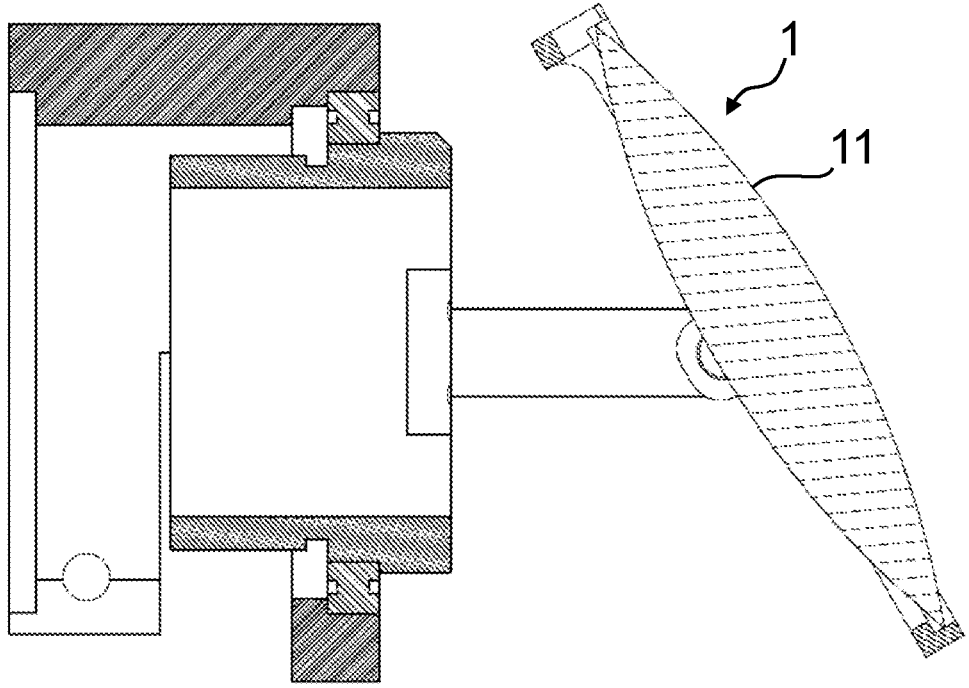
Figure 16:
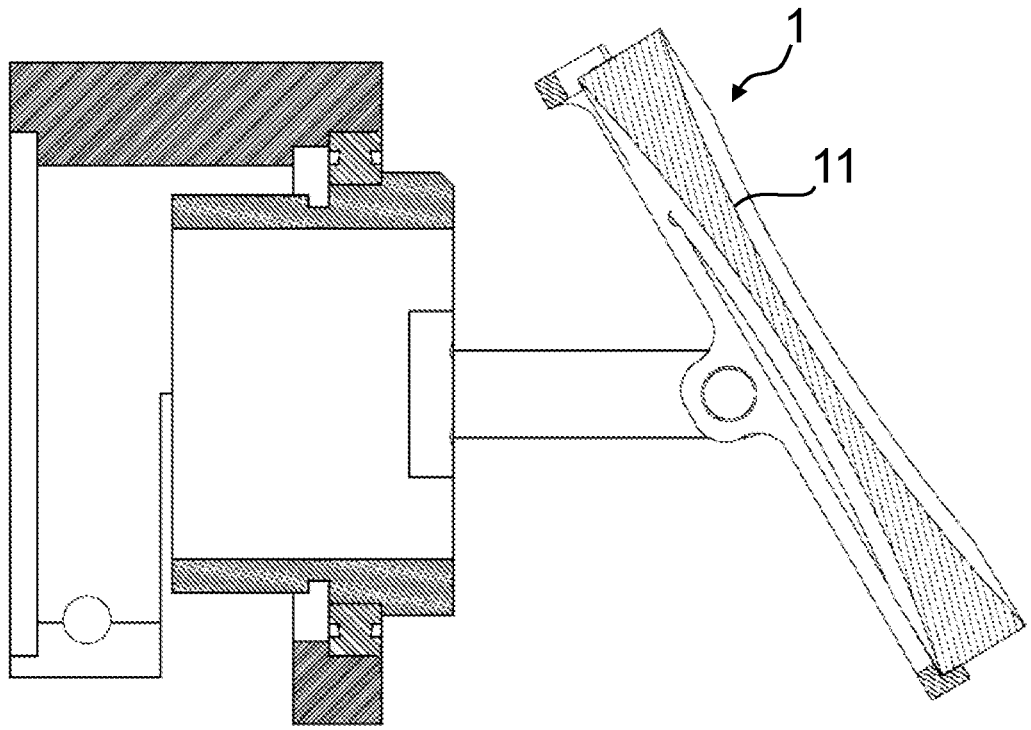

In the embodiments of FIGS. 15 and 16 the optical element 1 consists of a convex and concave optical lens 11, respectively.

Figure 17:
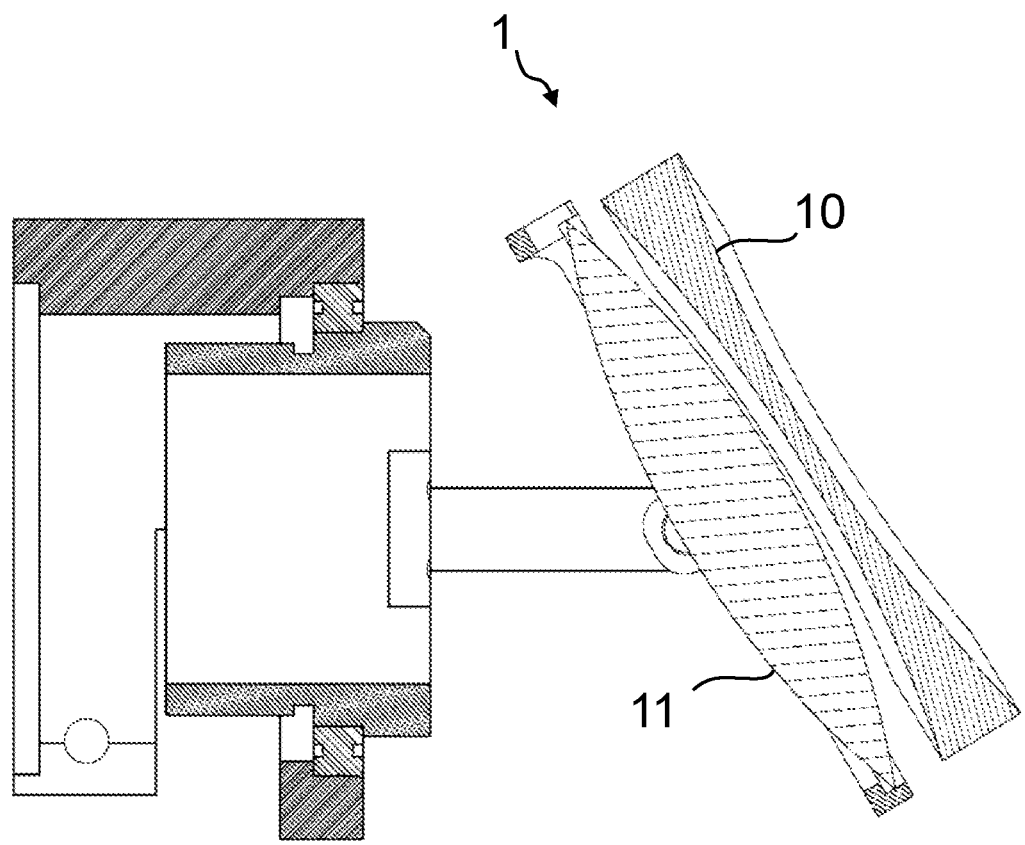

In the embodiment example of FIG. 17, the optical element comprises an optical lens 11 and a mirror 10 overlapping each other. Any combination of optical lenses (convex, concave, spherical), mirrors or other elements provided with optically useful surfaces adapted to interact with an incident light beam may be used according to the present invention.

The invention claimed is:

1. A device for the spherical orientation of an optical element, which device comprises a support structure, one said optical element having an optically useful surface adapted to interact with an incident light beam, a mechanism mounted on said support structure and capable of rotating said optical element in space around a first and a second rotation axis perpendicular to each other, said mechanism comprising a first rotating assembly around the first rotation axis and a second rotating assembly around the second rotation axis, which first rotating assembly has a through cavity defined around said first rotation axis, said through cavity being adapted to be crossed by said light beam and facing said optical element, wherein said mechanism comprises at least one first electromagnetic actuator arranged to rotate said first rotating assembly and at least one second electromagnetic actuator arranged to rotate said second rotating assembly; wherein the first rotating assembly is rotatably coupled to the support structure and the second rotating assembly is coupled to the first rotating assembly and comprises a support member of the said optical element; wherein the first electromagnetic actuator comprises a first fixed coil and a first movable magnetic element and/or the second electromagnetic actuator comprises a second fixed coil and a second movable magnetic element; and wherein the first rotating assembly comprises a tubular element having a longitudinal axis coinciding with the first rotation axis and defining said through cavity, said first electromagnetic actuator comprising a first magnetic element circumferentially arc-shaped and centred in the first rotation axis, said first magnetic element being coupled externally to the tubular element such that the first magnetic element lies on said circumference centred in the first rotation axis, said first electromagnetic actuator further comprising one said first coil fixed to the support structure and shaped so as to have an arcuate housing seat for rotating said first magnetic element.

2. The device according to claim 1, wherein the support structure is provided with a tubular element support seat, in which the tubular element is rotatably coupled by means of a bearing.

3. The device according to claim 1, wherein the first electromagnetic actuator comprises a first movable coil and a first fixed magnetic element and/or the second electromagnetic actuator comprises a second movable coil and a second fixed magnetic element.

4. The device according to claim 1, wherein the first rotating assembly and/or the second rotating assembly comprise one or more rotary encoders for feedback control.

5. A device for the spherical orientation of an optical element, which device comprises a support structure, one said optical element having an optically useful surface adapted to interact with an incident light beam, a mechanism mounted on said support structure and capable of rotating said optical element in space around a first and a second rotation axis perpendicular to each other, said mechanism comprising a first rotating assembly around the first rotation axis and a second rotating assembly around the second rotation axis, which first rotating assembly has a through cavity defined around said first rotation axis, said through cavity being adapted to be crossed by said light beam and facing said optical element, wherein said mechanism comprises at least one first electromagnetic actuator arranged to rotate said first rotating assembly and at least one second electromagnetic actuator arranged to rotate said second rotating assembly;

wherein the first rotating assembly is rotatably coupled to the support structure and the second rotating assembly is coupled to the first rotating assembly and comprises a support member of the said optical element;

wherein the first electromagnetic actuator comprises a first fixed coil and a first movable magnetic element and/or the second electromagnetic actuator comprises a second fixed coil and a second movable magnetic element; and wherein the second electromagnetic actuator comprises one said second magnetic element circumferentially arc-shaped and centred in the second rotation axis, which second magnetic element is coupled to the support member of the optical element so that the second magnetic element lies on said circumference centred in the second rotation axis, the second electromagnetic actuator further comprising one said second coil fixed to the first rotating assembly and shaped so as to have an arcuate housing seat for rotating said second magnetic element.

* * * * *